(12) United States Patent
Becker et al.

(10) Patent No.: US 10,307,801 B2
(45) Date of Patent: Jun. 4, 2019

(54) ROTATING CLEANER

(71) Applicant: GEA TUCHENHAGEN GMBH, Buchen (DE)

(72) Inventors: Kai Becker, Hamburg (DE); Richard Collins, Cradley (GB)

(73) Assignee: GEA TUCHENHAGEN GMBH (DE)

( * ) Notice: Subject to any disclaimer, the term of this patent is extended or adjusted under 35 U.S.C. 154(b) by 0 days.

(21) Appl. No.: 15/558,693

(22) PCT Filed: Mar. 14, 2016

(86) PCT No.: PCT/EP2016/055427
§ 371 (c)(1),
(2) Date: Sep. 15, 2017

(87) PCT Pub. No.: WO2016/146568
PCT Pub. Date: Sep. 22, 2016

(65) Prior Publication Data
US 2018/0111175 A1    Apr. 26, 2018

(30) Foreign Application Priority Data

Mar. 18, 2015 (DE) .......... 10 2015 003 559

(51) Int. Cl.
*B05B 1/04* (2006.01)
*B05B 1/34* (2006.01)
(Continued)

(52) U.S. Cl.
CPC ............ *B08B 9/0936* (2013.01); *B05B 1/044* (2013.01); *B05B 1/3402* (2018.08); *B05B 3/026* (2013.01);
(Continued)

(58) Field of Classification Search
CPC ....... B05B 1/044; B05B 1/046; B05B 1/3402; B05B 3/026; B05B 3/06; B05B 13/06;
(Continued)

(56) References Cited

U.S. PATENT DOCUMENTS 3,021,078 A    2/1962  Nickell
2006/0049276 A1* 3/2006 Ivy .................. A62C 25/00
                                                239/251

FOREIGN PATENT DOCUMENTS

DE         753817       4/1976
DE      202010010979   10/2010
(Continued)

OTHER PUBLICATIONS

English language translation of Written Opinion issued in the corresponding International Patent Application, pp. 1 to 5.
(Continued)

*Primary Examiner* — Levon J Shahinian
(74) *Attorney, Agent, or Firm* — Merek, Blackmon & Voorhees, LLC

(57) ABSTRACT

The invention relates to a rotating cleaner (1) comprising a housing (2) which has a cavity (10) and an inlet (9) which is connectable to a fluid supply line, a shaft (11) extending in sections into the cavity (10), a sprayer body (3) which has an interior space (14), said sprayer body (3) being connected non-rotatably with the shaft (11) and including an outlet opening (6), and further comprising a bearing (16) for rotatably supporting the shaft (11) in the housing (2). To improve the spray pattern, it is proposed that the fluid manifold (13; 13') designed for uniform distribution of the fluid is arranged in the interior space (14).

20 Claims, 4 Drawing Sheets

A-A

Figure 1:
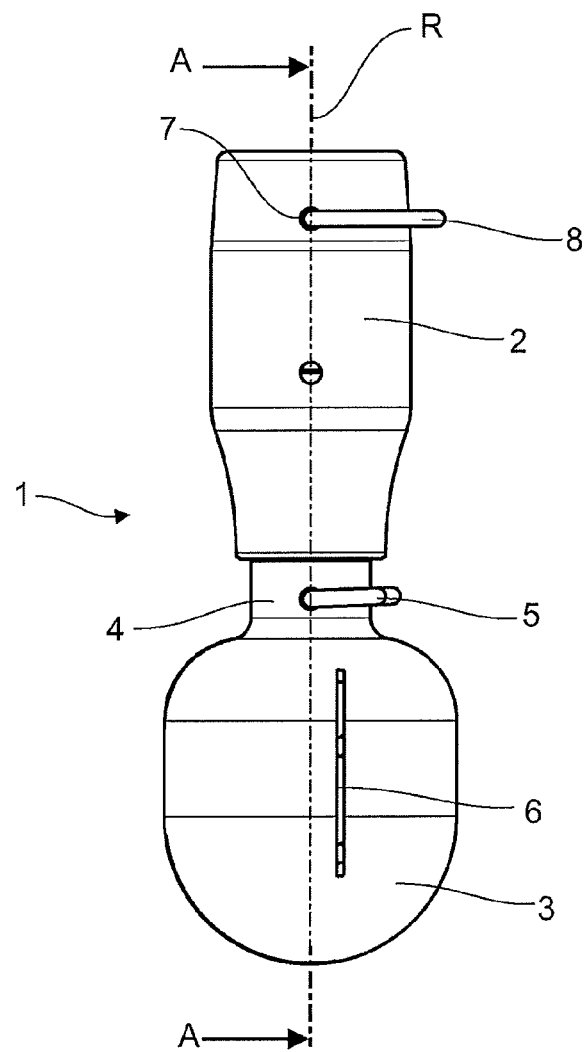

(51) Int. Cl.
*B05B 3/02* (2006.01)
*B05B 3/06* (2006.01)
*B05B 13/06* (2006.01)
*B05B 15/55* (2018.01)
*B08B 3/02* (2006.01)
*B08B 9/08* (2006.01)
*B08B 9/093* (2006.01)
*F16C 17/10* (2006.01)

(52) U.S. Cl.
CPC ............ *B05B 3/06* (2013.01); *B05B 13/0636* (2013.01); *B08B 3/02* (2013.01); *B08B 9/0813* (2013.01); *F16C 17/10* (2013.01); *B05B 1/046* (2013.01); *B05B 13/06* (2013.01); *B05B 15/55* (2018.02); *B08B 2203/0247* (2013.01)

(58) Field of Classification Search
CPC ....... B05B 13/0636; B05B 15/55; B08B 3/02; B08B 9/0813; B08B 9/0936; B08B 2203/0247; F16C 17/10

USPC ............................................. 134/166 C, 180
See application file for complete search history.

(56) References Cited

FOREIGN PATENT DOCUMENTS

| | | | |
|---|---|---|---|
| EP | 1582265 A2 * | 10/2005 | ............ B05B 3/026 |
| EP | 1886733 | 2/2008 | |
| GB | 2257619 | 1/1993 | |
| JP | 2011173080 | 9/2011 | |
| WO | WO9532805 | 12/1995 | |

OTHER PUBLICATIONS

German Search Report issued in connection with corresponding German Patent Application, pp. 1 to 9.

* cited by examiner

A-A

ROTATING CLEANER

The invention relates to a rotating cleaner according to the preamble of the first claim.

Rotating cleaners are known from the prior art and have been used successfully for many years in the process industry. By process industry is meant here the fields of food and beverage engineering, pharmaceuticals and biochemistry, in particular.

The cleaners involved in these fields are used to remove contaminants from the interior wall of a vessel, for example of a storage tank. They have a rotating sprayer body having one or more outlets from which a cleaning fluid is discharged. Rotation of the sprayer body causes the entire inner wall surface of the vessel to be wetted with cleaning fluid, wherever possible. This rotation is produced by the cleaning fluid flowing through the cleaner.

The arrangement of the openings on the sprayer body, in combination with the rotation of the sprayer body of the cleaner, thus determines how the discharged cleaning fluid is distributed.

A first cleaner of this kind is shown in GB 1604650 A. A spherical sprayer body having an interior space is attached to a hollow shaft. The latter is mounted rotatably in a housing, for which an axial sliding bearing and a radial sliding bearing are used. A ball exposed to a flow of cleaning fluid and which is arranged between a surface on the housing side and a surface on the rotating body side causes the sprayer body to rotate. The cleaning fluid passes through the hollow shaft from the housing into the interior space of the sprayer body. The spherical sprayer body has a plurality of orifices from which cleaning fluid is discharged.

Another generic cleaner is presented by DE 102005015534 B3. A spray head with a shaft is mounted rotatably about a longitudinal axis in a housing. Cleaning fluid flows into the spray head via a channel in the shaft. Inside said channel, a drive member with which the spray head can be made to rotate is arranged transversely to the longitudinal axis. A flow linearizer having a plurality of annularly arranged flow channels oriented parallel to the longitudinal axis is provided between an inlet and the drive member. As a result, rotation is no longer affected in undesirable ways by turbulence in the cleaning fluid, and interruptions caused to rotational movement by such turbulence is prevented. This effect is based on improving flow along the longitudinal axis and thus along the rotational axis of the cleaner.

Another way of improving the spray pattern of a rotating cleaner having one or more spray jets is proposed by DE 102011078857 A1. The cleaner has a rotor on which at least one outlet opening is provided and which is rotatably mounted inside a housing. According to the proposal, a swirl chamber is provided between the housing and the rotor. This swirl chamber affects the flow of cleaning fluid in the rotor in such a way that the rotational speed of the rotor is stabilized.

The object of the invention is to provide a rotating cleaner having an improved spray pattern.

This object is achieved with a rotating cleaner having the features of claim 1. Dependent claims 2 to 10 specify advantageous developments of the rotating cleaner.

The rotating cleaner comprises a housing which has a cavity and an inlet which is connectable to a fluid supply line, and a shaft extending in sections into the cavity. A sprayer body is connected non-rotatably with the shaft, has an interior space and includes at least one outlet opening. The shaft is rotatably supported by a bearing. In the interior space of the sprayer body, a fluid manifold designed for uniform distribution of fluid is arranged. The uniform distribution of the cleaning fluid in the interior space of the sprayer body, which is brought about by the fluid manifold, substantially reduces the occurrence of turbulence in the cleaning fluid. In the absence of turbulence, the cleaning fluid is discharged very evenly from the at least one outlet opening, thus producing a better spray pattern.

A further improvement in uniform distribution is achieved by the fluid manifold completely covering a shaft inlet port of the interior space and having a plurality of openings for uniform distribution of fluid.

Distribution of the cleaning fluid in the sprayer body is additionally improved when the fluid manifold is arranged co-rotatingly with the sprayer body.

A cost-efficient development of the invention, which also heightens the aforementioned advantages, is one in which the fluid manifold comprises a hollow body having a cylinder and a dome-shaped front end.

This construction can be further improved by providing the fluid manifold at a maximum of the dome-shaped front end with a discharge opening which causes the fluid manifold to empty. This prevents cleaning fluid or any other fluid from remaining in the fluid manifold, in particular in the dome-shaped region, and is therefore particularly hygienic.

An additional improvement in uniform distribution of the cleaning fluid before it leaves the sprayer body through the outlet opening is achieved by uniformly distributing the openings on the fluid manifold. This uniformity can be achieved, in particular, by arranging the openings symmetrically in relation to the rotational axis of the cleaner.

A further improvement in the spray pattern is obtained when a summated pass-through area of the openings is at least equal to a pass-through area of the outlet opening or to the summated pass-through area of the outlet openings, because this prevents a loss of pressure in the cleaning fluid between the fluid manifold and the outlet openings.

It is advantageous when the fluid manifold is made of a stainless special steel. This allows cost-efficient production and is particularly suitable for applications in which hygienic conditions must prevail. A fluid manifold made of stainless steel is characterized by excellent resistance to chemicals and solvents and by a high level of mechanical stability.

A simple kind of bearing that provides smooth rotation, thus improving the spray pattern, is one in which the bearing is designed as a sliding bearing having a slide surface acting in the axial and the radial direction for rotatably supporting the shaft.

It is advantageous to avoid interfaces between components, because dirt can accumulate there and has to be removed. It is advantageous, therefore, if the shaft and the fluid manifold are integral in design.

In one development of the invention, the self-cleaning properties of the cleaner are improved when the shaft penetrates a recess which is provided on the housing and which has a wall surface designed to deflect fluid flowing along the shaft to the housing in the direction of the spray ball.

The bearing mechanism is improved, and consequently the smooth operation of the sprayer body and the spray pattern also, when the shaft has a feed opening directly underneath a bearing cone for supplying the bearing with pressurized fluid. This fluid flowing into the bearing produces a force which counteracts the force exerted on the fluid manifold by the fluid flowing into the cleaner. These counteracting forces reduce the total force, thus causing a reduction in the dynamic frictional forces.

The invention shall now be described in further detail with reference to an embodiment and developments of the invention, and the effects and advantages shall be described in greater depth.

Figure 2:
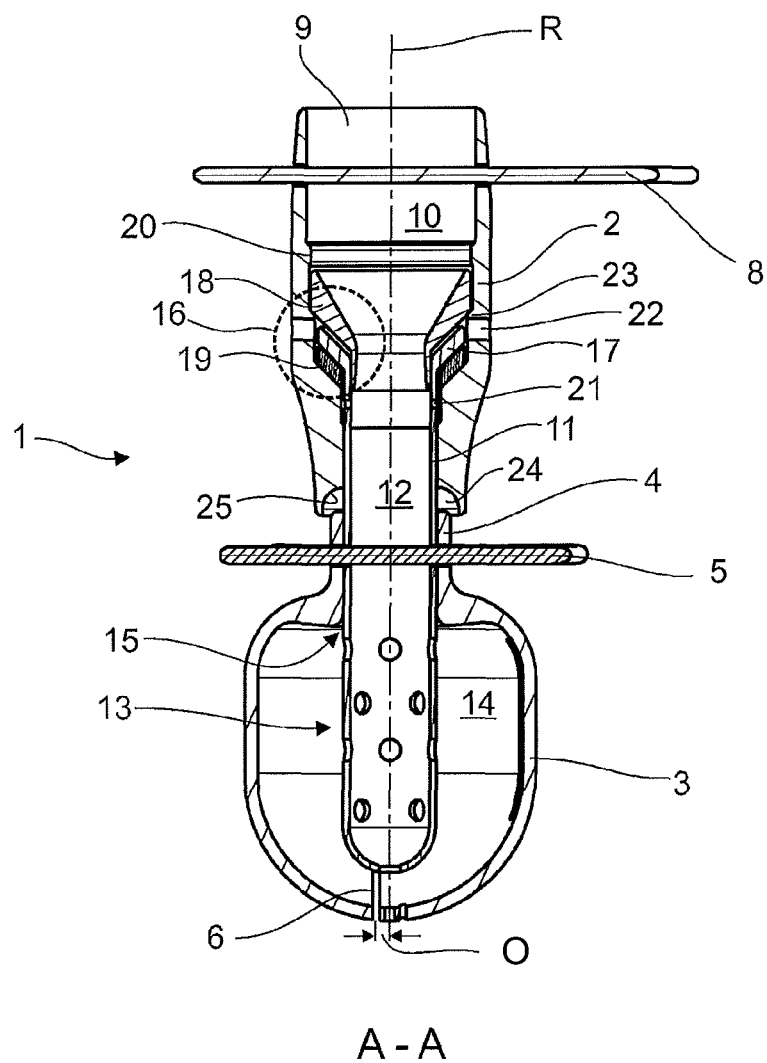
Figure 3:
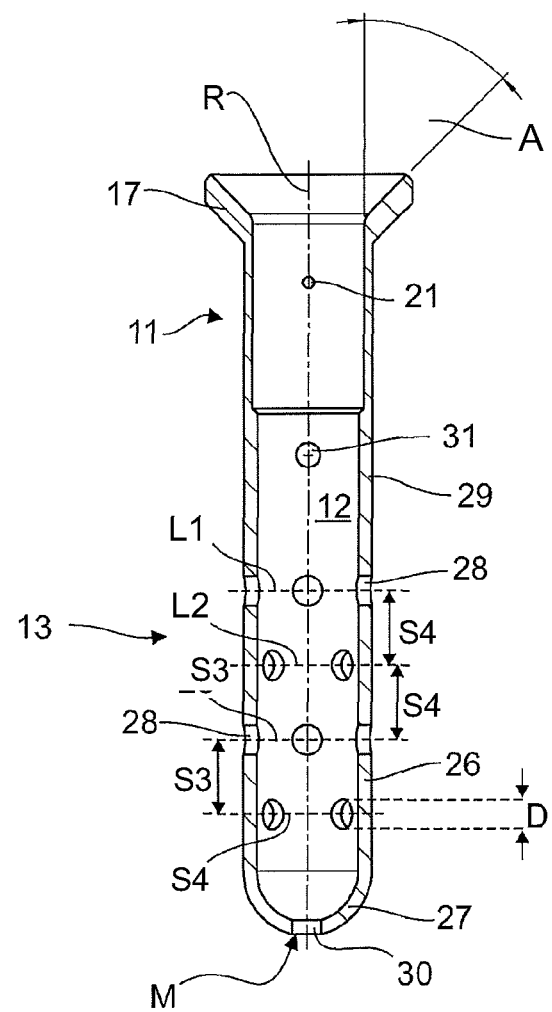
Figure 4:
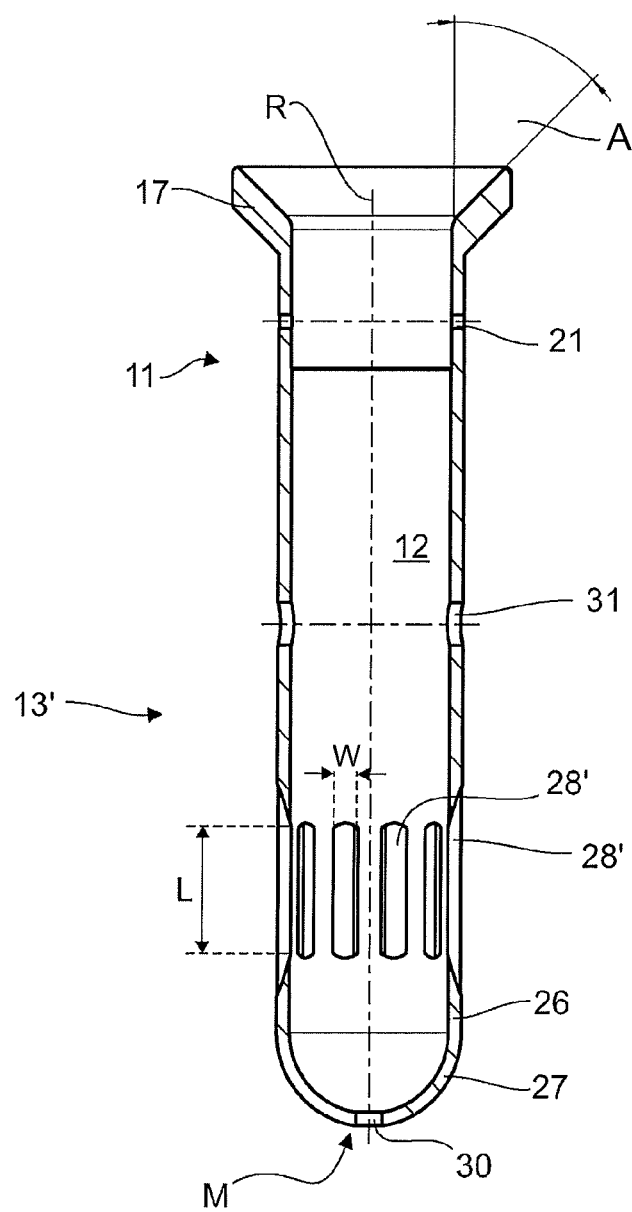

Reference is made to the Figures, in which:

FIG. 1: shows a side view of a rotating cleaner;

FIG. 2: shows a longitudinal cross-section through the rotating cleaner along line A-A;

FIG. 3: shows a longitudinal cross-section through a fluid manifold;

FIG. 4: shows a longitudinal cross-section through a fluid manifold according to a development of the invention.

A side view of a rotating cleaner 1 is shown in FIG. 1. Rotating cleaner 1 has a housing 2 and a rotatable sprayer body 3. Sprayer body 3 has a neck 4 in which a shaft is accommodated. A detachable connection between neck 5 and the shaft can be effected by means of a clip 5. Housing 2 of cleaner 1 has a pinhole 7. This allows cleaner 1 to be releasably connected to a feed line for fluids, not shown, for example for the cleaning fluid of a cleaning in place process. Pinhole 7 can receive a pin 8, for example, or a clip.

Alternatively, cleaner 1 may be connectable to the feed line by a screw connection or welded connection.

At least one outlet opening for a cleaning fluid is provided on sprayer body 3. In this example, the outlet opening is in the form of a slot 6 extending longitudinally along rotational axis R.

A cross-section of rotating cleaner 1 along line A-A is shown in FIG. 2.

Housing 2 has an inlet 9 which is connectable to a fluid supply line, not shown, and which makes cavity 10 accessible for fluid. A shaft 11 is mounted rotatably in cavity 10. Shaft 11 has a shaft interior 12 which is in fluidic communication with cavity 10. Shaft 11 protrudes from housing 2 and penetrates the neck 4 of sprayer body 3. When cleaner 1 is in cleaning mode, cleaning fluid flows through shaft interior 12 and through fluid manifold 13 into an interior space 14 of sprayer body 3. To minimize turbulence, the fluid manifold may be designed in such a way that it completely covers shaft interior 12 and a shaft inlet port 15 which penetrates neck 4.

Fluid manifold 13 is designed so that the cleaning fluid is distributed uniformly and with substantially reduced turbulence in interior space 14 when cleaner 1 is in operation. The cleaning fluid exits sprayer body 3 as a jet of cleaning fluid through slot 6 or through a plurality of such slots. Slot 6 is arranged and formed in the wall of sprayer body 6 in such a way that the sprayer body is made to rotate. To that end, slot 6 is offset relative to rotational axis R by an offset O, and slot 6 does not extend in the wall in a radial direction along sprayer body 3.

The rotatable support for shaft 11 in housing 2 is provided by a bearing 16, which is advantageously embodied as a sliding bearing in the example described here.

At one end of shaft 11 facing inlet 9, a bearing cone 17 is formed on shaft 11, the surface of which has sliding bearing characteristics. Bearing cone 17 interacts with idle bearing surfaces of matching shape. These may be formed on a guide sleeve 18 and an optional spacer ring 19.

Guide sleeve 18 projects into shaft interior 12 and stabilizes shaft 11 in the radial and axial direction simultaneously. The mobility of guide sleeve 18 is limited in the axial direction by a projection 20 formed on an inner wall of housing 2.

Projection 20, guide sleeve 18, housing 2 and shaft 11 are designed for simple assembly and disassembling of cleaner 1 in such a way that shaft 11 is firstly inserted into housing 2, if necessary after inserting spacer ring 19. Guide sleeve 18 is then pushed over projection 20 and snaps into place.

The sliding bearing is lubricated with cleaning fluid which penetrates through at least one feed opening 21 provided in shaft 11 into the gap between guide sleeve 18 and bearing cone 17, between bearing cone 17 and spacer ring 19 and between spacer ring 19 and housing 2. The lubricating cleaning fluid flows out of bearing 15 through at least one discharge opening 22 provided in the housing. Feed opening 21 supplies bearing 15 with pressurized cleaning fluid. This cleaning fluid flowing into bearing 15 produces a force which counteracts the force exerted on the fluid manifold by the fluid flowing into cleaner 1. Whereas the cleaning fluid flowing into cleaner 1 produces a downward force along the rotational axis in FIG. 2, an upward force in FIG. 2 is produced by the pressure in the gaps in bearing 15 that are described above. These counteracting forces reduce the total force acting on the bearing surfaces, thus causing a reduction in the dynamic frictional forces. The operation of bearing 15, the smooth operation of sprayer body 3 and consequently the spray pattern of cleaner 1 are improved as a result.

This effect can be further enhanced by forming a projecting support 23 in housing 2, which limits movement of guide sleeve 18 in the direction of sprayer body 3, in that guide sleeve 18 rests on a conically shaped surface of projecting support 23. Guide sleeve 18 is then held with some play by projection 20 and projecting support 23.

A bearing 16 is formed by the conical design of the bearing surfaces on shaft 11, of guide sleeve 18 and of spacer ring 19, thus providing radial and axial bearing support simultaneously with a set of contiguous surfaces. Such a bearing 16 that acts as an angular contact bearing makes sprayer body 3 run more smoothly due to improved centering. Production is simplified due to the small number of surfaces that have to be manufactured with precision. Compared to the prior art, it is therefore easier to achieve greater precision for bearing 16. This greater precision likewise improves the smooth running and rotational characteristics, and thus the spray pattern as well. Due to the smaller number of components and simpler geometry, cleaner 1 can be cleaned better and is less susceptible to dust and dirt, so it is easier to meet the applicable standards according to 3A and EHEDG.

Fluid manifold 13 is advantageously made of stainless special steel, advantageous examples being 316L and 318S13 according to the AISI (American Iron and Steel Institute) standard, or stainless steel types 1.4404 and 1.4440 according to the European standard EN 10027-2. Stainless steels having the characteristics of these named examples may be used. Their rustproof property, i.e. a high corrosion resistance and resistance to media containing chlorine, as well as their machinability the fields of application for the cleaner, as mentioned at the outset, are important for the selection of materials. A fluid manifold 13 made of stainless steel is characterized by excellent resistance to chemicals and solvents and a high level of mechanical stability.

Another way of meeting these standards in a simple manner is if shaft 11 is made of polyether ether ketone (PEEK) or a plastic material having similar properties. PEEK, in particular, provides excellent properties for sliding bearings, for example in conjunction with stainless steel, which is then used for housing 2. A fluid manifold 13 made of PEEK therefore interacts particularly advantageously with the respective development of the invention. It also allows spacer ring 19 to be dispensed with, which is otherwise needed when a fluid manifold 13 and a housing are both made of stainless steel, in order to have a pair of materials which are capable of forming a sliding bearing.

Shaft 11 penetrates a recess 24 on housing 2, which is arranged at an opposite end of housing 2 from inlet 9. Recess 24 has a wall surface 25 which is dome-shaped so that recess 24 is designed to deflect fluid flowing along the shaft to the housing in the direction of the spray ball. The cross-section in FIG. 2 through wall surface 25 is rounded in shape. This shape results in recess 24 having an advantageous effect on the self-cleaning of cleaner 1. Cleaning fluid can pass through the gap that arises due to production factors between an outer wall of shaft 11 and the inner wall of a bore in neck 4, out of sprayer body 3 along shaft 11 toward housing 2. This fluid is under pressure and flows into recess 24. Due to the domed shape of wall surface 25, the fluid is deflected and forms a jet of cleaning fluid that hits an outer surface of sprayer body 3 and neck 4, where it has a cleaning effect. Recess 24 also has such an effect in a rotating cleaner 1 even in the absence of a fluid manifold 13. However, fluid manifold 13 produces a more uniform flow of fluid through the gap between fluid manifold 13 and sprayer body 3 along neck 4, thus improving the cleaning effect of the fluid which is deflected at recess 24.

In FIG. 3, fluid manifold 13 is shown in detail and in cross-section along rotational axis R.

Fluid manifold 13 is designed as a hollow body. The hollow body comprises a cylinder 26 and a dome-shaped front end 27. A plurality of openings 28 penetrate the wall 29 of fluid manifold 13.

An even number of openings are provided on cylinder 26. They are arranged on four levels L1, L2, L3 and L4 in the example shown. On each level, openings 28 are distributed on an outer circumference of the cylinder with equal spacing from each other. In the case of four openings 28 on one level L1, L2, L3 or L4, one opening 28 is provided every 90° around the circumference. Level L1 is spaced apart from level L2 by spacing S1. A spacing S2 is provided between levels L2 and L3. Levels L3 and L4 are arranged with a spacing S3 between them. Spacings S1, S2 and S3 are advantageously equal except for a few percent divergence, preferably in the single-digits. This arrangement of openings 28 within the levels and of levels L1, L2, L3 and L4 in relation to each other equates to a uniform distribution of the openings. This uniform, symmetrical distribution is advantageous for strongly reducing any turbulence inside interior space 14 of sprayer body 3, thus improving the rotation of sprayer body 3 and the spray jet, and thus the spray pattern as well. The number of openings 28 in any one level L1, L2, L3 and L4, and the number of levels L1, L2, L3 and L4, can be adjusted to achieve the effects described. This may be necessary, for example, when rotating cleaner 1 is available in different sizes.

Cleaner 1 may be mounted inside the container to be cleaned, in such a way that the rotational axis R points approximately in the direction of gravitational force. For that reason, dome-shaped front end 27 has a discharge opening 30 at its maximum M corresponding in this installed position to the lowest point in relation to the gravitational force. This ensures that fluid manifold 13 empties when in the correctly installed position, so that no residual fluid is left inside it.

If cleaner 1 is to be used in fields where compliance with EHEDG and 3A standards is required, it is expedient if openings 28 are designed with a diameter D of at least 3.2 mm. Discharge opening 30 may likewise have the same diameter D.

The number of openings 28, their diameter D and the diameter of any discharge opening 30 that is provided, result in a total area through which fluid can overflow from shaft interior 12 into the interior space 14 of sprayer body 3. This total surface is dimensioned by selecting the number of opening openings 28 and their diameter D so that it is at least equal to the surface through which fluid can flow out of sprayer body 3. Fluid exits sprayer body from outlet opening 6, in particular, or through the plurality of outlet openings 6. In addition to that, fluid can flow through the gap between neck 4 and shaft 11. This flow through the gap is advantageously taken into account when dimensioning the summated flow-through area on fluid manifold 13, particularly when this gap flow is used systematically for self-cleaning cleaner 1.

Integral embodiment of shaft 11 and fluid manifold 13 results in simpler assembly, inexpensive production and doing without component interfaces. Cylinder 26 merges seamlessly with shaft 11.

Bearing cone 17 is formed on shaft 11 and is located at the end of the shaft opposite cylinder 26 in the direction of rotational axis R. Angle A of bearing cone 17 is adapted to the function of the combined bearing 16, which is designed for simultaneous support in the axial and the radial direction. The angle may range from 30 degrees to 60 degrees, and is advantageously 45 degrees with a 5-degree deviation in either direction.

The component comprising shaft 11 and fluid manifold 13 has a pin hole 31 for receiving clip 5. As described with reference to FIG. 1, clip 5 provides a releasable connection between neck 4 of sprayer body 3 and shaft 11. This construction causes fluid manifold 3 to rotate with sprayer body 3. This co-rotation reduces turbulence in sprayer body 3 still further.

FIG. 4 shows a fluid manifold 13' in a developed form, in which the development of the invention relates to the design of opening 28'. In this example, a plurality of openings 28' are provided in the form of slots which can be produced by sawing, for example. Each slot-shaped opening 28' has a long axis L and a width W, the flow-through area being determined by those dimensions. The total area through which the cleaning fluid coming from shaft interior 12 can exit fluid manifold 13' into interior space 14. As in the first example of a fluid manifold 13, this total area is dimensioned so that it is at least equal to the area through which fluid can flow out of sprayer body 3. This substantially reduces any congestion and turbulence of the fluid.

The plurality of slot-shaped openings shown in FIG. 4 are advantageously distributed at regular intervals around the circumference. These openings act in conjunction with discharge opening 30 at maximum M of the dome-shaped front end 27.

LIST OF REFERENCE SIGNS

1 Rotating cleaner
2 Housing
3 Sprayer body
4 Neck
5 Clip
6 Outlet opening
7 Pinhole
8 Pin
9 Inlet 10 Cavity
11 Shaft
12 Shaft interior
13, 13' Fluid manifold
14 Interior space
15 Shaft inlet port
16 Bearing
17 Bearing cone
18 Guide sleeve
19 Spacer ring
20 Projection
21 Feed opening
22 Discharge opening
23 Projecting support
24 Recess
25 Wall surface
26 Cylinder
27 Dome-shaped end
28, 28' Opening
29 Wall
30 Discharge opening
31 Clip hole
W Width
L Length
R Rotational axis
O Offset
M Maximum
A Angle
L1 First level of openings
L2 Second level of openings
L3 Third level of openings
L4 Fourth level of openings
D Diameter of an opening
S1 Spacing between L1 and L2
S2 Spacing between L2 and L3
S3 Spacing between L3 and L4

The invention claimed is:

1. A rotating cleaner (1) comprising a housing (2) which has a cavity (10) and an inlet (9) which is connectable to a fluid supply line, a shaft (11) extending in sections into the cavity (10), a sprayer body (3) which has an interior space (14), said sprayer body (3) being connected non-rotatably to the shaft (11) and including an outlet opening (6), and further comprising a bearing (16) for rotatably supporting the shaft (11) in the housing (2), characterized in that a fluid manifold (13; 13') designed for uniform distribution of a fluid is arranged in the interior space (14), and the interior space of the sprayer body surrounds an entire outer circumference of the fluid manifold and a bottom distal end of the fluid manifold.

2. The cleaner according to claim 1, characterized in that the fluid manifold (13; 13') completely covers a shaft inlet port (15) of the interior space and has a plurality of openings (28; 28') for uniform distribution of fluid.

3. The cleaner according to claim 2, characterized in that the fluid manifold (13; 13') is arranged co-rotatingly with the sprayer body (3).

4. The cleaner according to claim 1, characterized in that the fluid manifold (13; 13') comprises a hollow body having a cylinder (26) and a dome-shaped bottom distal end (27).

5. The cleaner according to claim 4, characterized in that the fluid manifold (13) has a discharge opening (30) which is provided at a maximum (M) of the dome-shaped bottom distal end (27) and which causes the fluid manifold (13; 13') to empty.

6. The cleaner according to claim 5, characterized in that a plurality of openings (28; 28') are distributed uniformly on the fluid manifold.

7. The cleaner according to claim 5, characterized in that a summated pass-through area of a plurality of openings (28; 28') is at least equal to a summated pass-through area of the outlet opening (6).

8. The cleaner according to claim 5, characterized in that the fluid manifold (13; 13') is made of a stainless steel.

9. The cleaner according to claim 5, characterized in that the bearing (16) comprises a sliding bearing having a slide surface acting in an axial and a radial direction for rotatably supporting the shaft (11).

10. The cleaner according to claim 5, characterized in that the shaft (11) and the fluid manifold (13; 13') are integral in design.

11. The cleaner according to claim 5, characterized in that the shaft (11) penetrates a recess which is provided on the housing (2) and which has a wall surface (25) which is designed to deflect fluid flowing along the shaft (11) to the housing (2) in a direction of the sprayer body (3).

12. The cleaner according to claim 5, characterized in that the shaft (11) has a feed opening (21) directly underneath a bearing cone (17) for supplying the bearing (16) with pressurized fluid.

13. The cleaner according to claim 1, characterized in that a plurality of openings (28; 28') are distributed uniformly on the fluid manifold.

14. The cleaner according to claim 1, characterized in that a summated pass-through area of a plurality of openings (28; 28') is at least equal to a summated pass-through area of the outlet opening (6).

15. The cleaner according to claim 1, characterized in that the fluid manifold (13; 13') is made of a stainless steel.

16. The cleaner according to claim 1, characterized in that the bearing (16) comprises a sliding bearing having a slide surface acting in an axial and a radial direction for rotatably supporting the shaft (11).

17. The cleaner according to claim 1, characterized in that the shaft (11) and the fluid manifold (13; 13') are integral in design.

18. The cleaner according to claim 1, characterized in that the shaft (11) penetrates a recess which is provided on the housing (2) and which has a wall surface (25) which is designed to deflect fluid flowing along the shaft (11) to the housing (2) in the direction of the sprayer body (3).

19. The cleaner according to claim 1, characterized in that the shaft (11) has a feed opening (21) directly underneath a bearing cone (17) for supplying the bearing (16) with pressurized fluid.

20. The cleaner according to claim 1, characterized in that the fluid manifold (13; 13') is arranged co-rotatingly with the sprayer body (3).

* * * * *